US007334712B2

(12) United States Patent
Hassett et al.

(10) Patent No.: US 7,334,712 B2
(45) Date of Patent: Feb. 26, 2008

(54) PERSONAL STORAGE APPARATUS FOR WHEELCHAIRS AND OTHER MOBILITY ASSISTANCE DEVICES

(75) Inventors: Eric S. Hassett, Golden, CO (US); Virgit U. Lippert, Westminster, CO (US); Douglas D. Matthews, Lyons, CO (US); Geoffrey T. Hyatt, Westminster, CO (US)

(73) Assignee: Thule Organization Solutions, Inc., Longmont, CO (US)

( * ) Notice: Subject to any disclaimer, the term of this patent is extended or adjusted under 35 U.S.C. 154(b) by 0 days.

(21) Appl. No.: 11/282,159

(22) Filed: Nov. 17, 2005

(65) Prior Publication Data

US 2006/0102670 A1 May 18, 2006

Related U.S. Application Data

(60) Provisional application No. 60/629,031, filed on Nov. 17, 2004.

(51) Int. Cl.
*B60R 7/00* (2006.01)
*A61G 5/10* (2006.01)
*A45F 5/00* (2006.01)

(52) U.S. Cl. .................... 224/407; 280/304.1; 224/268

(58) Field of Classification Search ................ 224/658, 224/407, 104, 106, 268, 269, 218, 219; 150/104, 150/106; 383/111
See application file for complete search history.

(56) References Cited

U.S. PATENT DOCUMENTS

| | | | | | |
|---|---|---|---|---|---|
| 1,976,698 | A * | 10/1934 | Gihon | ........................ | 190/102 |
| 5,180,181 | A * | 1/1993 | Letechipia | ............... | 280/304.1 |
| 5,251,743 | A * | 10/1993 | Pulido et al. | ............. | 206/38.1 |
| 5,551,901 | A * | 9/1996 | Jaeger | ........................... | 441/6 |
| 6,085,353 | A * | 7/2000 | van der Sleesen | ............... | 2/69 |
| 6,179,025 | B1 * | 1/2001 | Sutton | ........................ | 150/105 |
| 6,264,032 | B1 * | 7/2001 | Hobbs | ........................ | 206/449 |
| 6,298,993 | B1 * | 10/2001 | Kalozdi | ...................... | 206/581 |
| 6,318,612 | B1 * | 11/2001 | MacNeil | ..................... | 224/572 |
| 6,360,405 | B1 * | 3/2002 | McDaid et al. | ........... | 24/265 R |
| 6,427,374 | B1 * | 8/2002 | Vaiani | ........................... | 42/85 |
| 6,845,737 | B1 * | 1/2005 | Austin | ........................ | 119/796 |
| 2002/0113102 | A1 * | 8/2002 | Klamm | ....................... | 224/153 |
| 2004/0016840 | A1 * | 1/2004 | Malvini et al. | .......... | 242/379.2 |

* cited by examiner

*Primary Examiner*—Nathan J. Newhouse
*Assistant Examiner*—Lester L. Vanterpool
(74) *Attorney, Agent, or Firm*—Sheridan Ross P.C.

(57) ABSTRACT

The present invention relates to personal storage devices that are adapted to interconnection to personal mobility devices such as wheelchairs. In one embodiment an accessory bag is interconnected to a docking station with a tethering device that may stretch or be retractable.

26 Claims, 5 Drawing Sheets

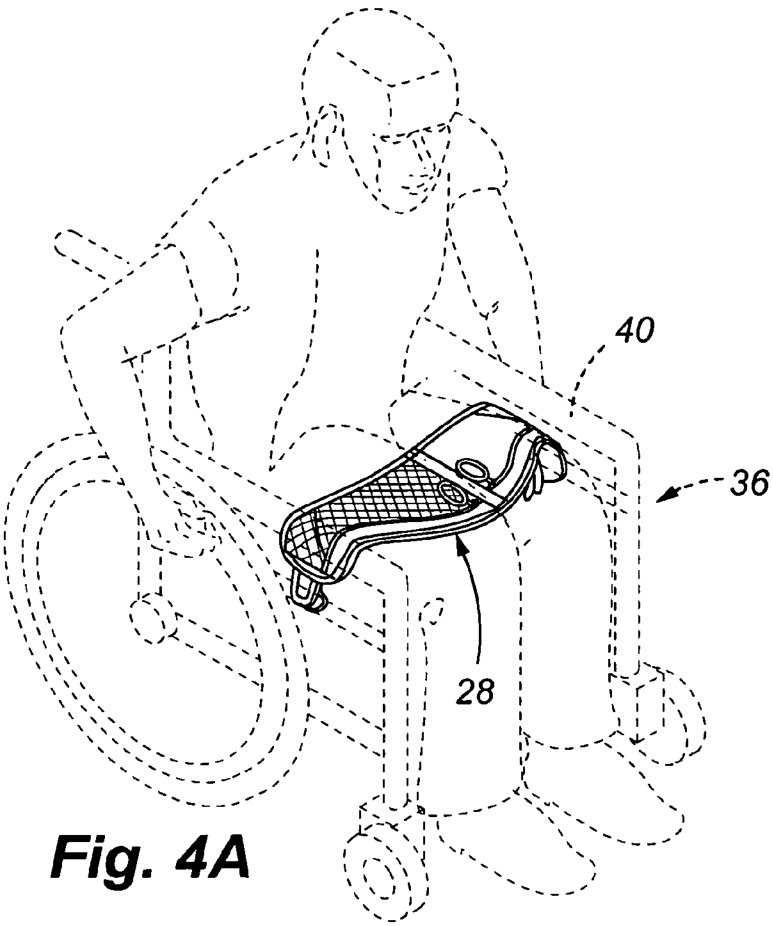
Fig. 4A
Fig. 4B
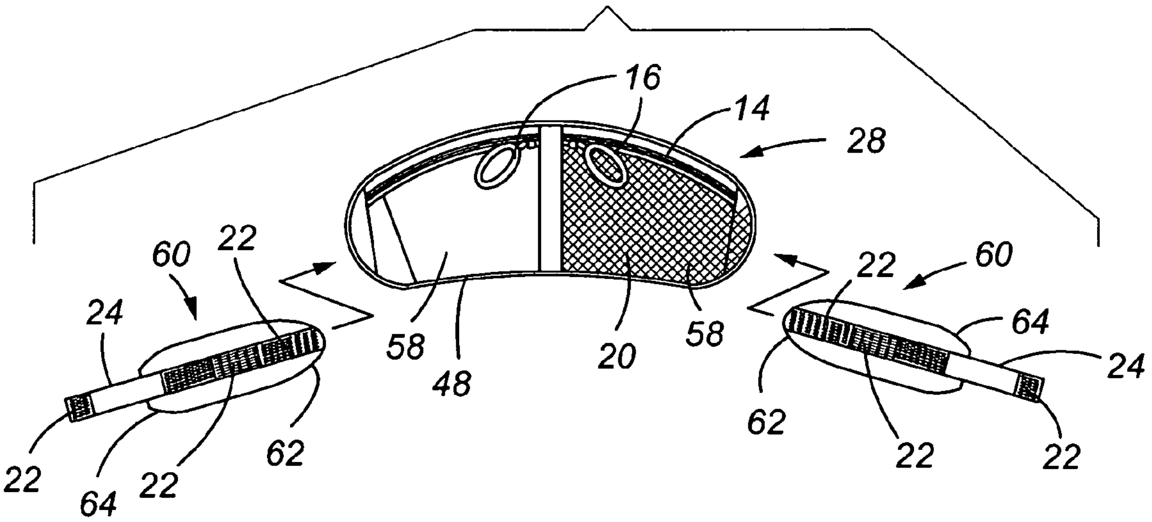

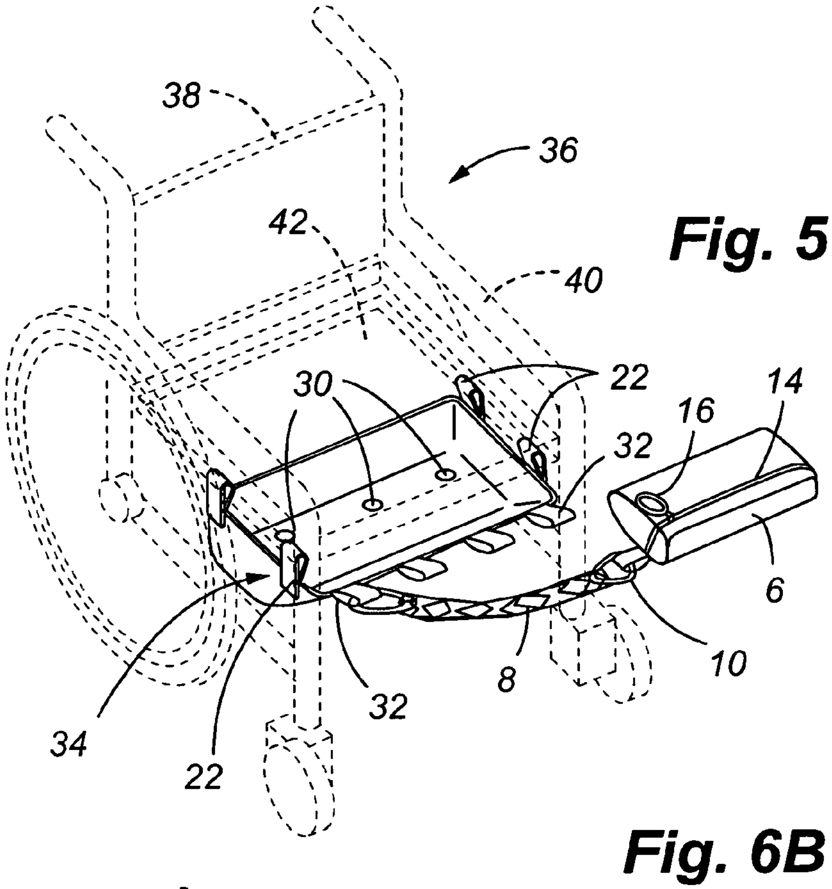
Fig. 5
Fig. 6A
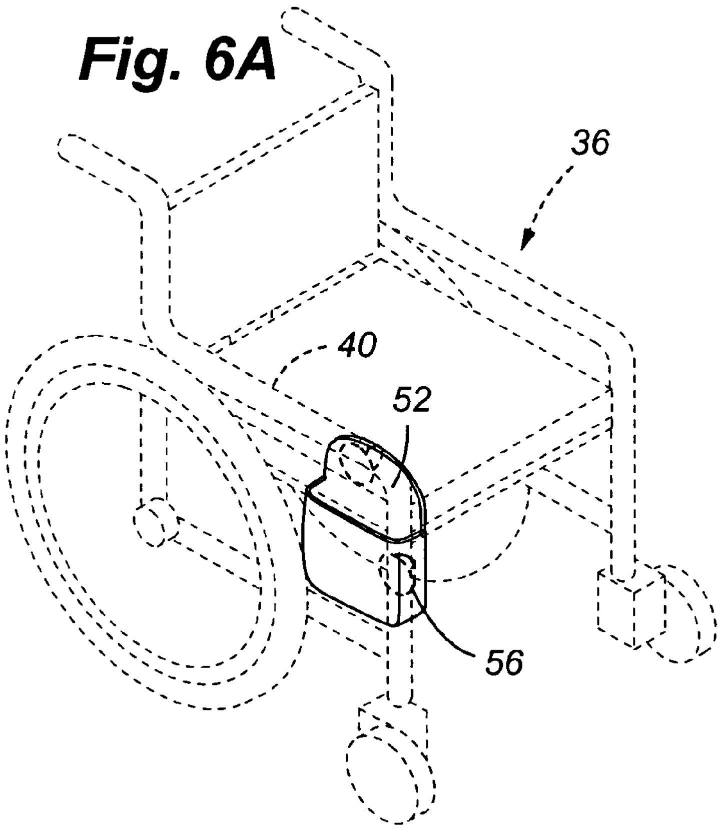
Fig. 6B
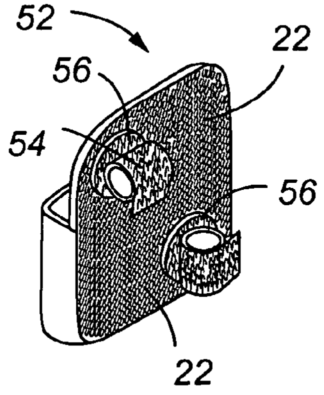
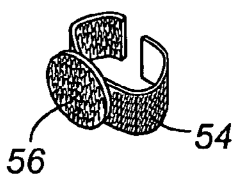
Fig. 6C

PERSONAL STORAGE APPARATUS FOR WHEELCHAIRS AND OTHER MOBILITY ASSISTANCE DEVICES

CROSS REFERENCE TO RELATED APPLICATION

The present application claims the benefit of U.S. Provisional Application No. 60/629,031 having a filing date of Nov. 17, 2004, the entire disclosure of which is incorporated herein by reference in its entirety.

FIELD OF THE INVENTION

The present invention relates to personal storage bags and accessory items that are adapted for removable interconnection to a wheelchair or other mobility assistance device, and that, in at least one embodiment, includes a docking station for receiving an accessory storage device that is interconnected with a tethering system.

BACKGROUND OF THE INVENTION

Storage devices designed for holding personal affects that are adapted for use with wheelchairs, scooters, motorized and other personal mobility assistance devices (interchangeably and collectively referred to herein as "wheelchairs" and/or "mobility devices") are generally known in the art. These products are generally made of flexible and/or rigid materials that are interconnected to the rear portion of a mobility device, and/or the armrest. These storage products are generally designed to hold items such as keys, wallets, water bottles, accessory clothing, and other personal affects for the elderly, physically challenged, developmentally disabled, and others that generally require a personal mobility device for transportation.

Unfortunately, due to the physical limitations of many users, it is difficult to access the storage devices due to zippers, pull strings, and other opening devices that are difficult to use. Thus, there is a significant need for personal storage products that are accessible and that may be easily opened and closed, while being selectively attached to a wheelchair or other type of personal mobility device.

There is further need to provide a personal storage device on mobility devices that are easily accessible, yet is secured to prevent others from taking advantage of the physically challenged and stealing personal affects, especially from the rear of a wheelchair. Accordingly, there is a need for a device that allows access to the personal storage device for a user, yet cannot be easily opened or removed by a third party. Furthermore, there is a need for a storage device that is interconnected to a tethering system that allows a user to utilize the storage device, and upon releasing the device, the device is then returned to its original position within a docking station or mother bag that has a perimeter shape designed to receive an accessory bag.

Furthermore, due to the overall dimension of a mobility device, it is often difficult for a user to pass through narrow door-ways on crowded locations with saddlebags or other storage devices that increase the overall width of the mobility device. Thus, there is a further need for storage devices that are designed to fit substantially entirely below an armrest, and thus are not an obstruction during use of the mobility device, which hinders the mobility through narrow passages.

Finally, there is a need for a storage device that can be selectively attached or detached from a mobility device without a user visually identifying a specific point of contact. More specifically, a storage device is needed that can be positioned proximate to a specific area, i.e., armrest, etc., and that utilizes a plurality of hook and loop tabs or other materials that are selectively interconnected to the storage device.

Accordingly, there is a strong need in the field of storage products for personal mobility devices that allow a user to easily access a storage device, and yet maintain personal affects stored therein in a safe and secure location. There is a further need to provide a tethering mechanism that allows the accessory bag to be retracted from a docking station or other position that does not require a user to visualize the mother bag or accessory bag for use, and that in at least one embodiment can be selectively attached and released from the personal mobility device.

SUMMARY OF THE INVENTION

The present invention substantially meets the aforementioned needs of the industry for the elderly, physically challenged and disabled that use personal mobility devices. More specifically, one aspect of the present invention includes a docking station or "mother bag" that is attached to a portion of a wheelchair or other mobility device. In one embodiment, the docking station is operably interconnected to an accessory bag by means of a tether or other type of cord that may be retracted or extended, wherein a user may access the accessory bag while sitting in a wheelchair and extending the accessory bag to a user's lap. Once the personal affects are removed from the accessory bag, the accessory bag may be released and the accessory bag will retract to the mother bag in a secure position. In a preferred embodiment of the present invention, the tethering system comprises an elastic or rubber material that is stretchable, and in an alternative embodiment the tethering system is interconnected to a retractable cord by means of a biasing system or spring that retains the accessory bag in operable engagement with the mother bag. Furthermore, the accessory bag may have a quick connect coupling, carabineer, or other system that allows the accessory bag to be removably disconnected from the mother bag and reattached as necessary. In one embodiment the mother bag is positioned on a rear portion of a wheelchair or mobility device. Alternatively, the mother bag or docking station is positioned below a user's seat or proximate to the armrests.

It is a further aspect of the present invention to provide a pouch or other accessory bag that is operably interconnected to an armrest of a personal mobility device such as a wheelchair. In one embodiment of the present invention, the pouch may be flipped over and placed in a position of use on a user's lap for easy access, and then flipped back to a first position of use wherein the pouch hangs from the armrest. Preferably, the pouch is designed to hang within the profile of the armrest, thus not protruding any wider than the chair itself and creating clearance problems when the mobility device is passed through a door frame or other area with limited dimensions. Preferably, the pouch positioned on the armrest has one or more openings that may be selectively closed and secured with a means that is designed for those that are physically challenged, and that are not readily exposed or seen when the armrest pouch is hung from the armrest for security purposes.

It is a further aspect of the present invention to provide a lap belt pocket that is designed to be worn across the lap of a user of a personal mobility device such as a wheelchair. Preferably, the lap belt includes one or more pockets that are easily accessible by the user, and that are not in plain view to prevent others from accessing the pockets without the user being aware of possible theft. Preferably, for comfort purposes, the lap belt pocket is comprised of a neoprene, foam, or mesh material that is not hot or uncomfortable after extended periods of use on a user's lap.

It is a further aspect of the present invention to provide a storage apparatus that can be selectively positioned on almost any portion of the mobility device and quickly adjusted to a preferred orientation and position of use. More specifically, in one embodiment a plurality of straps with hook and loop material is provided that is operably interconnected to a support structure or attachment disc that further includes a hook and loop material on an exterior surface. The support structure is designed to engage the hook and loop material attached to a rear surface of the storage apparatus, that can include a pouch, water bottle holder, or any possible shape that can be positioned on a wheelchair or other mobility device.

It is a further aspect of the present invention to provide an underseat bin with tethered accessory pouches and that is designed for positioning below the seat of a wheelchair or other personal mobility device. More specifically, in one embodiment a docking station or mother pouch is provided below the seat of the wheelchair, while an accessory pouch with a tethering system is operably interconnected to the docking station to prevent inadvertent disengagement or loss. More specifically, a user can pull the accessory pouch up to their lap and obtain personal affects from the accessory pouch and subsequently release the accessory pouch that is drawn back to the docking station with the tethering system for storage. Furthermore, in one embodiment of the present invention the docking station may have weep holes or apertures at a lower portion of the bin for drainage purposes if drinks or other fluids leak from the accessory pouch.

It is a further aspect of the present invention to provide a pull ring or zipper pull for interconnection to a zipper or other opening device, and that allows a user to insert their hand or one or more fingers. In at least one embodiment, the pull ring or zipper pull is a continuous length of rubber, elastic or other stretchable or pliable material with an internal opening having a width of at least about 1 inch, but may also be longer in a second direction, for example, having a substantially elliptical or triangular shaped opening. In accordance with at least one embodiment of the present invention, a zipper pull is provided comprising a means for interconnection to a closure device, such as a zipper or seal, the zipper pull further comprising a plurality of loops of material, wherein at least one opening between the loops is sized for receiving at least one of a user's fingers.

Thus, in one aspect of the present invention, a storage device is provided for interconnection to a personal mobility device, comprising:

a docking station having at least one receptacle having a first perimeter shape;

a means for interconnecting the docking station to the personal mobility device;

an accessory bag having a second perimeter shape that is adapted to matingly engage at least a portion of the first perimeter shape of the docking station;

at least one opening in the accessory bag to provide access thereto; and a tether operatively interconnected on a first end to the docking station, and on a second end to the accessory bag, the tether having a length sufficient to allow the accessory bag to be held and accessed by a user of the personal mobility device.

It is another aspect of the present invention to provide a method of utilizing a retractable storage device with a wheelchair or personal mobility device, comprising:

removing an accessory bag from a docking station, the accessory bag interconnected to the docking station by a tether, the removing including withdrawing the accessory bag from within at least a portion of a receptacle of the docking station, the docking station interconnected to the personal mobility device;

holding the accessory bag; and releasing the accessory bag;

wherein the accessory bag remains interconnected to the docking station after the releasing.

In accordance with embodiments of the present invention, a variety of devices and mechanisms may be utilized to accomplish the functionality of the present invention. Thus in one aspect of the present invention, a storage system adapted for interconnection to a personal mobility device is provided, the storage system comprising:

a means for containing defining a receptacle;

a means for interconnecting the means for containing to the personal mobility device;

a means for holding wherein at least a portion of the means for holding is sized for fitting within the receptacle; and a means for tethering the means for holding to the means for containing;

wherein the means for tethering maintains interconnection of the means for holding to the personal mobility device if the means for holding is dropped by a user.

The summary of the invention is neither intended nor is to be construed as being representative of the full extent and scope of the present invention. The present invention is set forth in various levels of detail in the summary of the invention as well as in the attached drawings and detailed description of the invention, and no limitation as to the scope of the present invention is intended by either the inclusion or exclusion of elements, components, etc. as provided herein. Additional aspects of the present invention will become more readily apparent from the detailed description, particularly when taken together with the drawings.

BRIEF DESCRIPTION OF THE DRAWINGS

The accompanying drawings, which are incorporated herein and constitute a part of the specification, illustrate embodiments of the invention together with the general description of the invention given above and the detailed description of the drawings given below, and serve to explain the principles of these embodiments. However, the invention is not intended to be limited by only the embodiments shown in the drawings, as will be appreciated by one skilled in the art.

FIG. 4A is a front perspective view of a wheelchair or personal mobility device with a lap belt pocket, as shown in more detail in FIG. 4B;

FIG. 4B is a top plan view depicting a lap belt pocket that is adapted for interconnection to a wheelchair or mobility device, and that is intended to rest on a user's lap;

FIG. 5 is a front perspective view of an underseat bin with a tethered accessory pouch that is adapted for positioning below a wheelchair or other mobility device;

FIG. 6A is a front perspective view of a wheelchair or personal mobility device with a variable position storage device, as shown in more detail in FIG. 6B;

FIG. 6B is a rear perspective view of a variable position storage device that utilizes attachment disks and straps that are adapted for interconnection to various portions of a personal mobility device;

FIG. 6C is a side perspective view of a device for interconnecting the variable position storage device of FIG. 6B to a wheelchair or personal mobility device.

DETAILED DESCRIPTION

Figure 1:
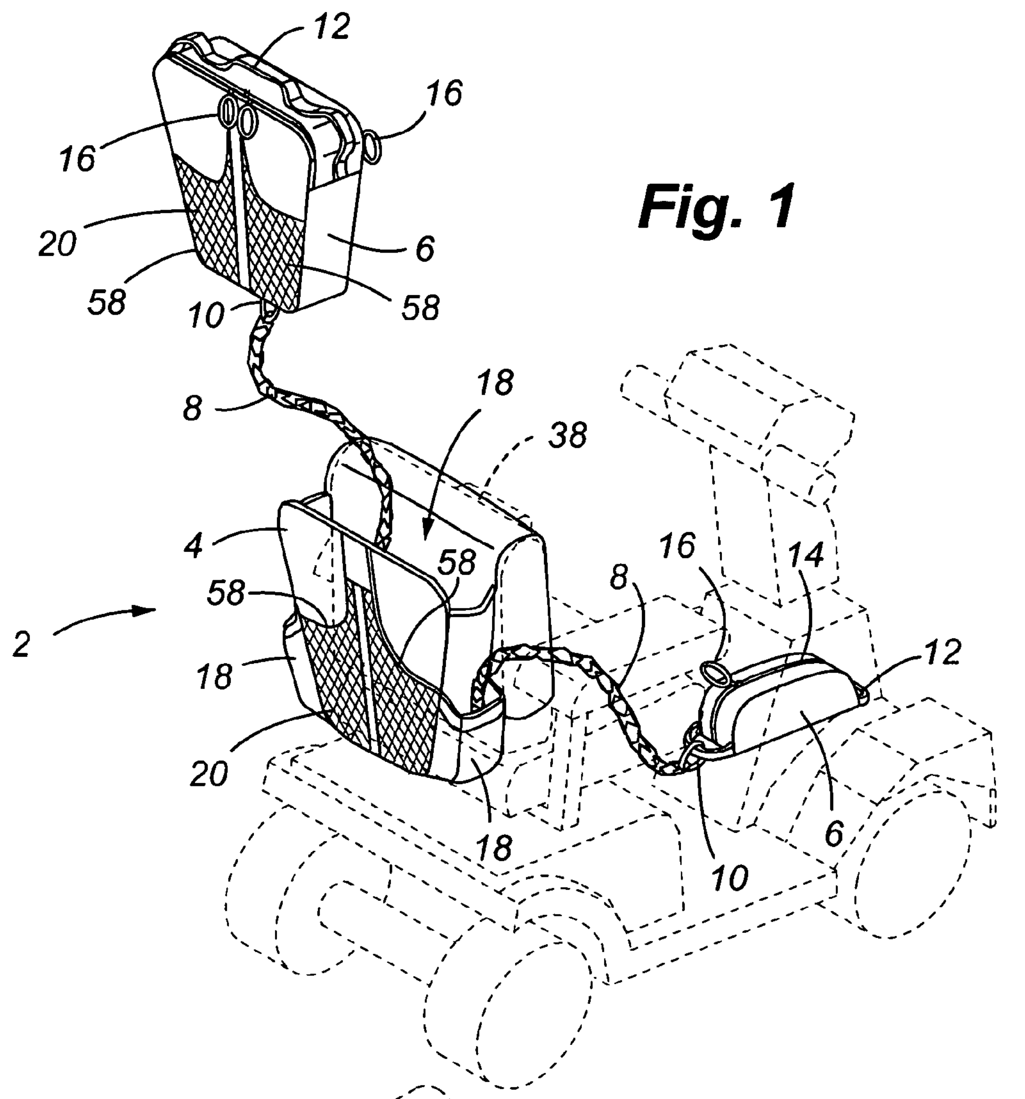
FIG. 1 depicts a rear perspective view of one embodiment of the present invention identifying a mother bag or docking station, one or more accessory bags, and a tether interconnected thereto.

Referring now to FIG. 1, one embodiment of the present invention is provided herein in a perspective view. More specifically, a wheelchair or personal mobility device storage bag 2 with mating accessory bags 6 is provided herein, and that generally includes a docking station or mother bag 4 that is interconnected by means of a tether 8 to an accessory bag 6. The mother bag 4 is generally interconnected to the personal mobility device 36 with straps utilizing hook and loop materials, buckles or other means known in the art. Alternatively, mother bag 4 may have a sleeve or pocket that fits over the seat 42, head rest and/or back rest 38 of the personal mobility device 36.

The mother bag 4 generally comprises a receptacle, compartment, or receiving pocket 18 with a dimension large enough to receive the accessory bag 6. Thus, a user can grab a handle 12 of the accessory bag 6 and pull the accessory bag 6 to their lap for convenient access. After removing the contents therefrom, the user releases the accessory bag 6, that is then directed back to the mother bag 4 for safe storage. Thus, the accessory bag 6 cannot be detached or removed from the mobility device 36 due to the tether 8 and accessory attachment hardware 10. The attachment hardware 10 can be comprised of any form of a carabineer, clamp, or any other interconnection hardware commonly known in the art. In a preferred embodiment, the attachment hardware 10 may include a combination or keyed padlock for security purposes that prevents the removal of the accessory bag 6 from the tether 8 without proper authorization. The mother bag 4 may further include one or more receiving pockets 18 that may be used as additional docking stations for smaller accessory bags 6, that may be provided independently for storing items such as a water bottle or other personal effects.

In an alternative embodiment of the present invention, a wheelchair or personal mobility device 36 may incorporate a seatback 38 or armrest 40 that integrally includes some form of a docking station or mother bag 4, and that may include a tethering system 8 and accessory bag 6. As appreciated by one skilled in the art, a personal mobility device 36 may be manufactured to integrally include one or more of the docking stations 4 and/or accessory bags 6 described herein.

In accordance with at least one embodiment of the present invention, the accessory bag 6 preferably includes one or more storage pockets 58 that may additionally be comprised of mesh materials 20 to facilitate viewing certain items such as maps, keys, and other personal effects. Furthermore, the accessory bag 6 and/or mother bag 4 may include one or more zippers 14 for selectively opening and closing the accessory bag 6. Preferably the zippers 14 include large zipper pulls 16 that may be easily grasped or otherwise engaged by the elderly or physically challenged, and that are sized to receive a user's fingers or entire hand. Preferably the hand or zipper pulls 16 are comprised of rubber, nylon, or elastic materials.

The mother bag 4 and accessory bag 6 of the present invention are preferably comprised of lightweight, flexible materials that are durable, preferably waterproof or water resistant, and that may be easily interconnected to the wheelchair 36 or other mobility device by means of straps, hook and loop materials, or sleeves that slide over the wheelchair back rest 38 or armrest 40. Furthermore, in a preferred embodiment, the mother bag 4 may be quickly detached from the wheelchair 36 to allow quick removal and subsequent use at a secondary location.

Figure 2:
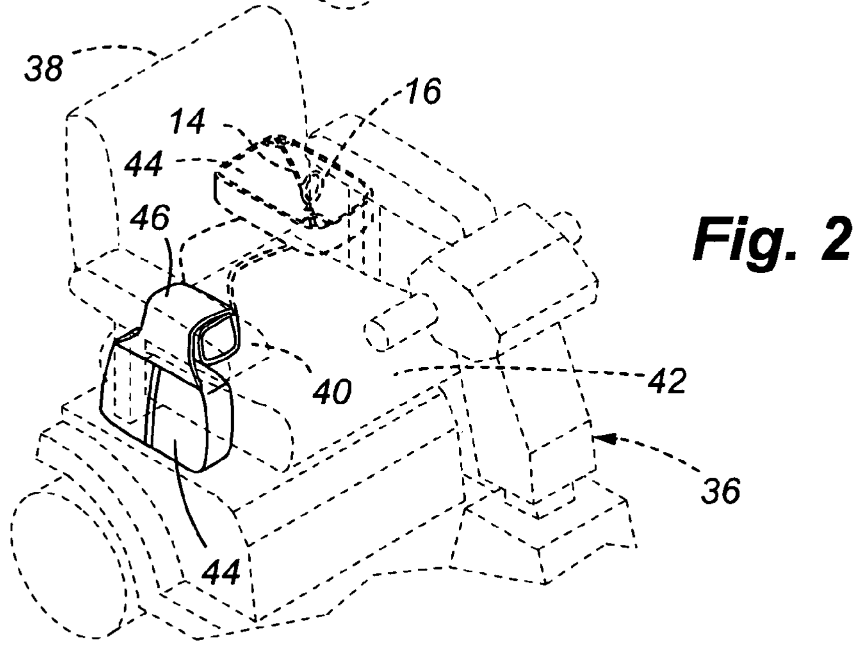
FIG. 2 depicts a flip over armrest pouch that is adapted for interconnection to a wheelchair or personal mobility device armrest and that is adapted for use in two distinct positions.

Referring now to FIG. 2, an alternative embodiment of the present invention is provided herein, and which generally depicts an armrest pouch 44. Generally, the armrest pouch 44 is removably interconnected to the wheelchair armrest 40 by means of an armrest pouch suspension strap 46. Preferably the suspension strap 46 is comprised of a material that prevents the strap from sliding or changing position on the armrest 40, such as a rubber, textured nylon or polypropylene. The armrest pouch suspension strap 46 may utilize hook and loop materials, buckles, or other interconnection means well known in the art that allow for selective interconnection and detachment from the wheelchair armrest 40. More specifically, the armrest pouch 44 is designed to hang on the wheelchair armrest 40 when not in use, and more preferably, the armrest pouch 44 hangs below the armrest 40. When the wheelchair user wishes to insert or remove personal effects from the armrest pouch 44, the armrest pouch 44 is swung over a user's lap, wherein the armrest pouch 44 is positioned on a user's lap and the contents contained therein accessed.

Preferably the armrest pouch 44 includes one or more pockets for storing personal effects that may include openings that are selectively closed with zippers 14, hook and loop materials, or other means well known in the art. Furthermore, if zippers 14 are implemented, large zipper pulls 16 are preferably used that assist in grasping and opening the zippers 14. Preferably the opening and zipper are oriented diagonally on the armrest pouch 44 to facilitate ease of opening.

Figure 3A:
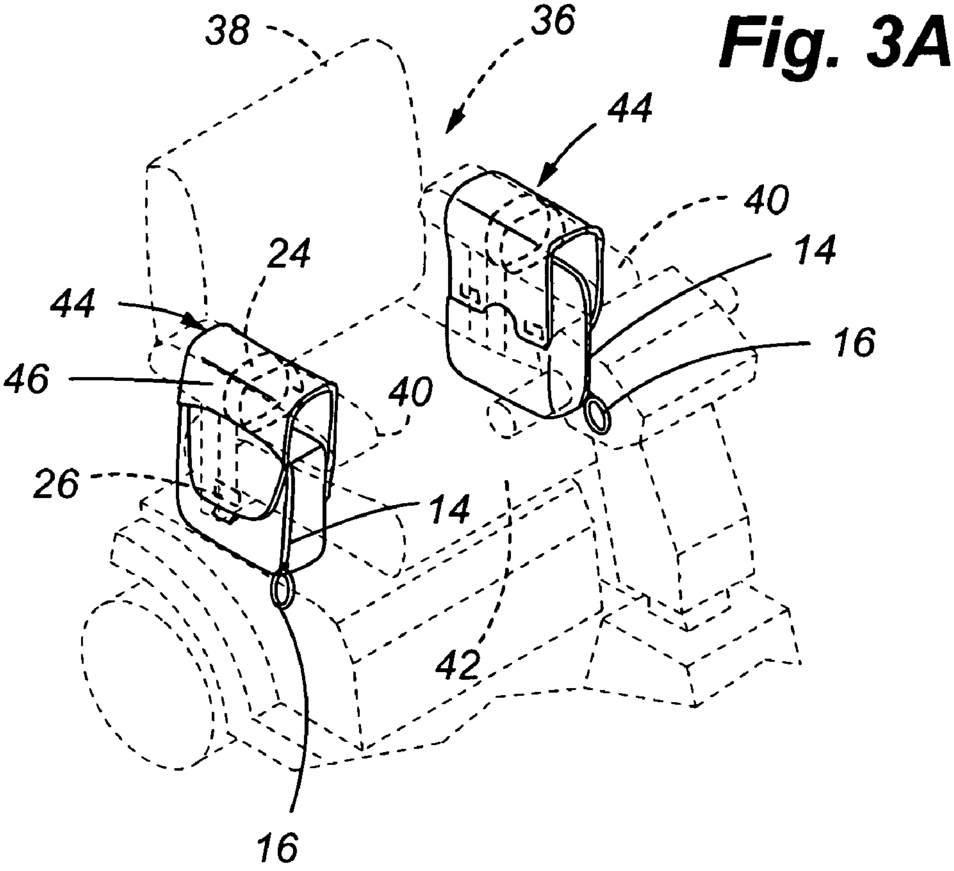
FIG. 3A is a front perspective view of a wheelchair or personal mobility device with an armrest pouch, as shown in more detail in FIG. 3B.
Figure 3B:
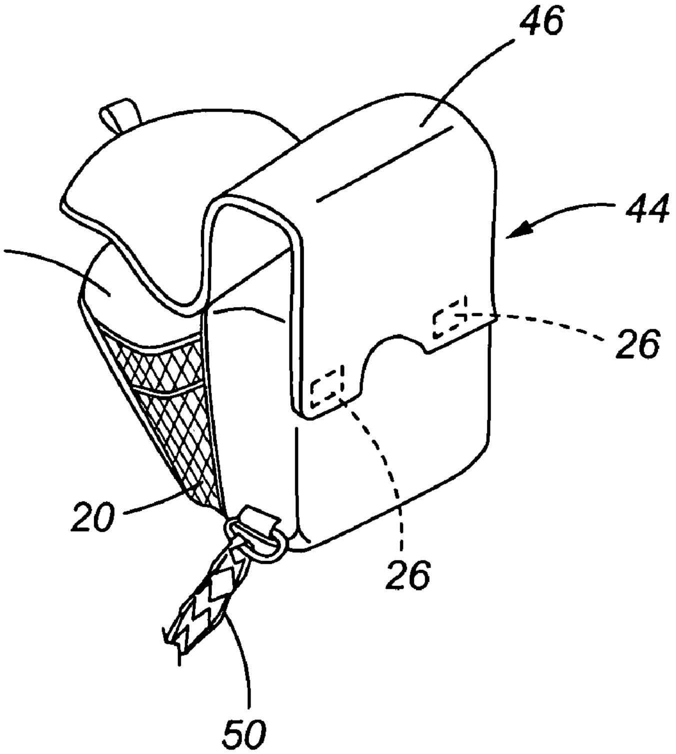
FIG. 3B is a front perspective view of an armrest pouch designed for removable interconnection to an armrest of a wheelchair or personal mobility device.

Referring now to FIGS. 3A and 3B, a perspective view of an armrest pouch 44 is provided herein, and shown interconnected to a wheelchair armrest 40. In this embodiment, the armrest pouch 44 is designed to hang directly below the wheelchair armrest 40, thereby allowing the wheelchair 36 to pass through narrow doorways and other restricted entries without obstruction. Preferably the armrest pouch 44 includes one or more storage pockets 58, some of which may be comprised of a mesh material 20. Furthermore, the armrest pouch suspension strap 46 is designed for removable interconnection to the wheelchair armrest 40 by means of one or more of a strap 24, hook and loop material, buckle material, a sleeve that slides over the wheelchair armrest 40, etc. Furthermore, in at least one embodiment, the cover of the armrest pouch 44 utilizes one or more magnet fasteners 26 that provide ease of opening for the physically disabled, and that automatically closes. The use of one or more magnet fasteners 26 is applicable for all the storage products described herein. Furthermore, cable ties 50 may be utilized to interconnect the armrest pouch 44, or any other storage device, to a portion of the personal mobility device 36 to prevent unwanted movement.

Referring now to FIGS. 4A and 4B, an alternative embodiment of the present invention is provided herein. More specifically, a lap belt 28 is provided for removable interconnection to a wheelchair 36 or other mobility device. As shown in the drawings, the lap belt 28 is designed for removable interconnection to either the wheelchair seat 42 or the wheelchair armrest 40, and may include hook and loop fasteners 22, buckles, or other interconnection means for attaching the lap belt 28 to one or more sides of the wheelchair 36. For example, in accordance with the embodiment shown in FIG. 4B, the lap belt 28 may include one or more removable connecting portions 60, wherein the connecting portions 60 include a first end 62 having hook and loop fasteners 22 for selectively interconnecting to a portion of the lap belt 28, such as the underside of the lap belt 28. In addition, the connecting portions 60 preferably include a second end 64 having a strap 24 with hook and loop fasteners for interconnecting the connecting portion 60 to an armrest 40 or other portion of the wheelchair or personal mobility device 36.

Referring still to FIG. 4B, and in accordance with at least one embodiment of the present invention, the lap belt 28 preferably has a contoured shape 48 that is adapted to fit on or adjacent a user's waist for extended periods of time without causing discomfort or bunching of the material that forms the lap belt 28. In addition, preferably the lap belt 28 has one or more storage pockets 58 that may be selectively opened with a zipper 14 or other means such as hook and loop fasteners, buckles, or other devices well known in the art. Preferably the zippers 14 include zipper pulls 16 for easy access, and the device is preferably made of a lightweight nylon or neoprene or foam material that may be rested on a user's lap without providing excessive weight and/or heat.

Referring now to FIG. 5, an alternative embodiment of the present invention is provided herein, wherein an underseat bin 34 is provided with one or more tethers 8 that are interconnected to an accessory bag 6. More specifically, the underseat bin 34 is designed to retain an accessory bag 6 by the means of one or more tethers 8. In at least one embodiment, the tethers 8 are operatively interconnected to the accessory bag 6 by the use of attachment hardware 10, that preferably includes a locking device for security purposes. Alternatively the tethers 8 may simply be tied to the accessory bag 6. Furthermore, one or more attachment loops 32 are interconnected along a perimeter edge of the underseat bin 34, and that are designed for attachment of one or more tethers 8 and accessory bags 6, as necessary. The multiple attachment loops 32 are provided to facilitate both right and left handed users, or for the physically disabled that are unable to use one hand.

Referring still to FIG. 5, in a preferred embodiment, the underseat bin 34 includes one or more weep holes 30 that are used to drain any retained liquid from water bottles, soda, or other products that may spill from the accessory bag 6 or other liquid container into the underseat bin 34. The use of one or weep holes 30 is applicable for all mother bags or docking stations described herein. The accessory bag 6 used with the underseat bin 34 may also include one or more storage pockets 58 that may be selectively opened by means of a zipper 14 or other means well known in the art. As further appreciated by one skilled in the art, the underseat bin 34 is interconnected to the wheelchair or other mobility device 36 with any attachment means, such as straps 24 with hook and loop material 22, buckles, or other means known in the art. Alternatively the underseat bin 34 may be an integral component of the personal mobility device 36.

Referring now to FIGS. 6A through 6C, an alternative embodiment of the present invention is provided herein. More specifically, a variable position storage device 52 is provided that is removably interconnected to a bar or other member of a wheelchair 36 by means of an interconnection strap 54 and attachment disks 56 that are operably interconnected to the interconnection straps 54. More specifically, the interconnection straps 54 are sewn, welded, glued or otherwise attached to the attachment disks 56, and that utilize hook and loop materials on either end, buckles or other interconnection means to interconnect the interconnection straps 54 to the wheelchair 36. Once the interconnection straps 54 and attachment disk 56 are selectively interconnected to the wheelchair 36, a variable position storage device 52 is pushed against the attachment disks 56 and selectively interconnected by means of a hook and loop material 22 that is positioned on a rear portion of the variable position storage device 52. As appreciated by one skilled in the art, the hook and loop fastener material 22 may be placed in rows or patches as opposed to covering substantially the entire back surface of the variable position storage device 52. By utilizing one or more interconnection straps 54 and associated attachment disks 56, the variable position storage device 52 can be placed at any angle or position of use preferred by the user, and can be used for any purpose such as retaining a water bottle, cell phone, or other device that is readily accessible by the user of the personal mobility device 36. Furthermore, the interconnection straps 54 and associated attachment disks 56 allow the interconnection of the variable position storage device 52 on substantially any portion of the wheelchair or personal mobility device 36, including the armrest 40, structural framework, back rest 38, or other portions associated therewith. Preferably, the variable position storage device 52 is comprised of lightweight material such as nylon, polyethylene, neoprene, and other materials well known in the art, and may have any conceivable shape, size or number of compartments.

In accordance with the various embodiments of the invention described herein, the tethers 8 may comprise a non-elastic material. Alternatively, the tethers 8 may comprise an elongate material having elastic properties, such as one or more sections of elastic straps, bungee cords, rubber bands, or other suitable materials. In addition, the tethers 8 may further comprise an outer sheath, wrapping, coating or sleeve of material 92 for encasing or surrounding at least a portion of the elongated elastic portion of the tether 8. The sleeve generally mitigates frictional resistance of the elongate elastic materials of the tethers 8 against adjacent items as the accessory bag 6 is pulled or released. In addition, the sleeve further limits the elastic portion of the tether from contacting a person's skin, and thereby causing pain to the affected skin surface upon rubbing of the tether against the skin surface.

In an alternative embodiment to an elongate material having elastic properties, the tethers 8 may comprise a cord and winding device, such as a winding spool having a biasing member such as a return spring mechanism that automatically rewinds the cord upon releasing the accessory bag 6. A motorized winding mechanism may also be used.

In use, a user can access an accessory bag 6 by grasping or otherwise engaging a handle 12 of the accessory bag 6, and then removing the accessory bag 6 from the mother bag 4. The user can then hold the accessory bag 6 and insert or obtain an item from the accessory bag 6. During the entire process of removing and holding or otherwise manipulating the accessory bag 6, the tether 8 provides an interconnection between the accessory bag 6 and the mother bag 4. Accordingly, should the user drop the accessory bag 6, the accessory bag 6 remains interconnected to the wheelchair or personal mobility device 36 to which the mother bag 4 is attached. Furthermore, in accordance with at least one embodiment of the present invention, the tether 8 includes retractable features that provide for the return of the accessory bag 6 to the receiving pocket 18 of the mother bag 4 when the user releases the accessory bag 6.

Referring now to FIGS. 7A through 7E, and in accordance with embodiments of the present invention, a variety of zipper pulls 16 are shown. As noted above, preferably the zippers 14 of the various embodiments of the present invention include large zipper pulls 16 that may be easily grasped or otherwise engaged by the elderly or physically challenged, wherein the zipper pulls 16 are sized to receive one or more of a user's fingers, or even an entire hand. Preferably the hand or zipper pulls 16 are comprised of rubber, nylon, or elastic materials, to facilitate stretching, and other materials capable of resiliently stretching as known by those skilled in the art may be utilized.

Figure 7A:
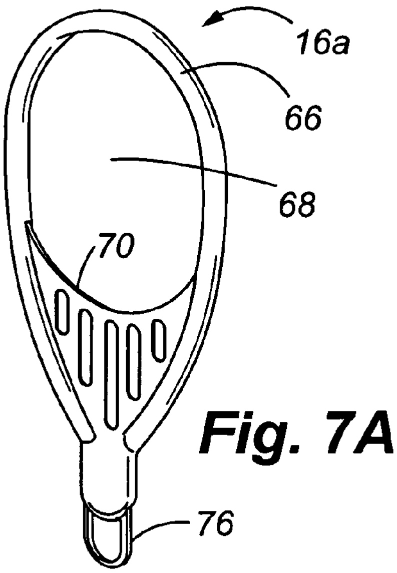
FIGS. 7A-7E are perspective views of various embodiments of zipper pulls in accordance with the present invention.

Referring now to FIG. 7A, a zipper pull 16*a* is provided having a single loop 66 of material forming a planar band with an opening 68 for receiving a user's finger or hand. The zipper pull 16*a* preferably includes a reinforcing base member 70 that provides structural strength to the device.

Figure 7B:
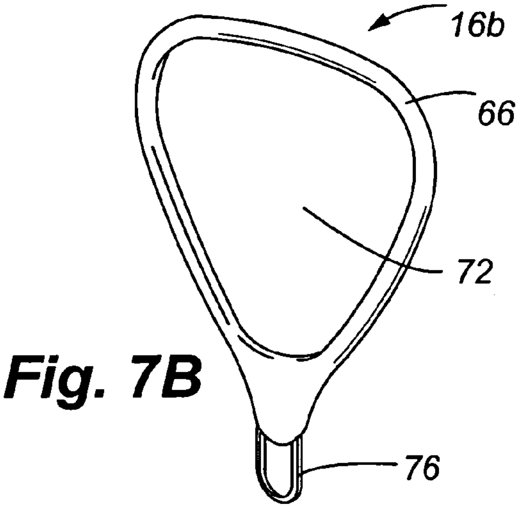

Referring now to FIG. 7B, a zipper pull 16*b* is provided having a single loop 66 of material that forms a planar band having a substantially triangular-shaped opening 72. The base of zipper pull 16*b* preferably includes a thickened base 74 that acts as a reinforcing member near the zipper connection mechanism 76.

Figure 7C:
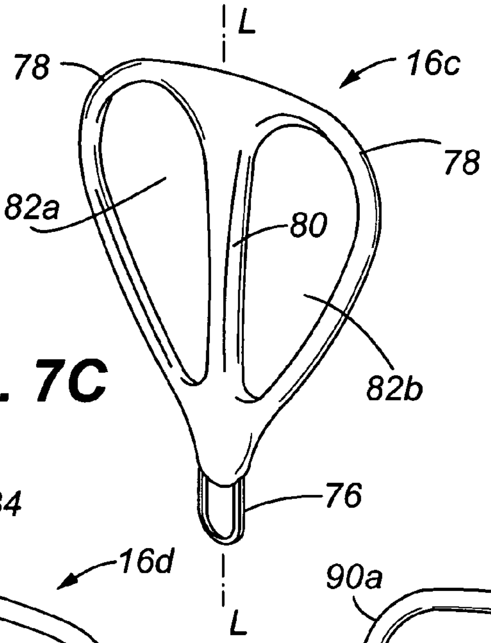

Referring now to FIG. 7C, a zipper pull 16*c* is provided having an outer loop 78 and an inner member 80, wherein the inner member 80 is substantially aligned along a longitudinal axis L-L of the zipper pull 16*c*. The inner member 80 is preferably co-planar with the outer loop 78. Between the inner member 80 and outer loop 78 are two openings 82*a* and 82*b* for one or more of the user's fingers and/or a portion of the user's hand.

Figure 7D:
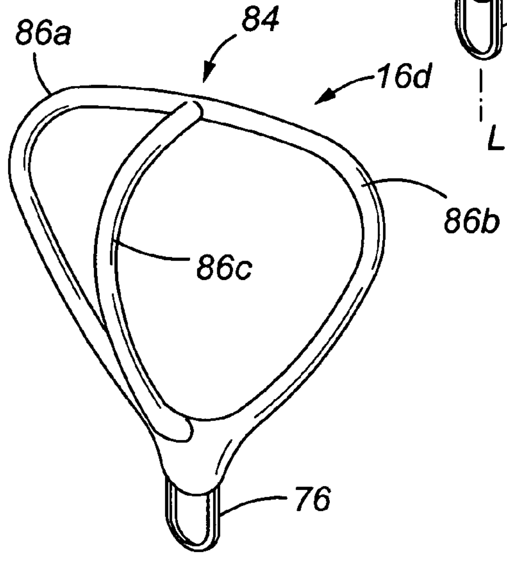

Referring now to FIG. 7D, a zipper pull 16*d* is provided having a plurality of loop portions, and more particularly, a three-part loop 84 comprising a first portion 86*a*, a second portion 86*b*, and a third portion 86*c*, wherein the first and second portions 86*a* and 86*b* are preferably co-planar. In addition, the third portion 86*c* is preferably not co-planar with portions 86*a* and 86*b*. In one embodiment, zipper pull 16*d* is formed by the addition of third portion 86*c* to the single loop 66 of zipper pull 16*b*. Openings between the portions 86*a*, 86*b*, and 86*c* are sized for receiving one or more of the user's fingers and/or a portion of the user's hand.

Figure 7E:
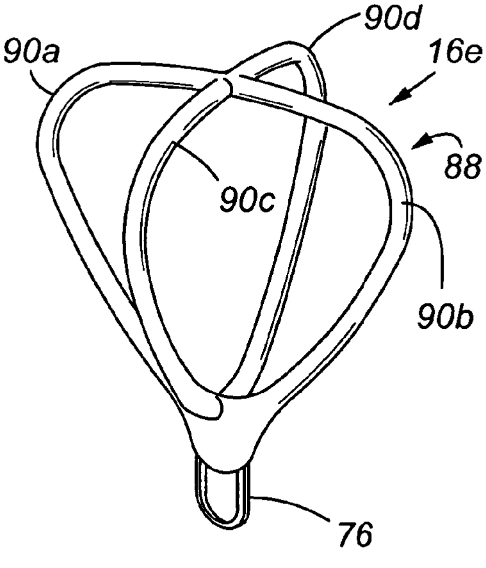

Referring now to FIG. 7E, a zipper pull 16*e* is provided having a plurality of loop portions, and more particularly, a four-part loop 88 comprising a first portion 90*a*, a second portion 90*b*, a third portion 90*c*, and a fourth portion 90*d*. The first and second portions 90*a* and 90*b* are preferably co-planar, as are the third and fourth portions 90*c* and 90*d*. However, the third and fourth portions 90*c* and 90*d* and set at an angle to first and second portions 90*a* and 90*b*. For the embodiment shown in FIG. 7E, the third and fourth portions 90*c* and 90*d* are set at a 90 degree angle to the first and second portions 90*a* and 90*b*. In one embodiment, zipper pull 16*e* is formed by the addition of third portion 90*c* and fourth portion 90*d* to the single loop 66 of zipper pull 16*b*; alternatively, a fourth portion 90*d* is added to the first portion 86*a*, second portion 86*b* and third portion 86*c* of zipper pull 16*d*. Openings between the portions 90*a*, 90*b*, 90*c* and 90*d* are sized to receive one or more of the user's fingers and/or a portion of the user's hand.

The non-planar and large features of zipper pulls 16*d* and 16*e* provide particularly advantageous accessibility for the physically challenged user. More specifically, the zipper pulls provide access despite their orientation because at least one loop will always remain elevated from a surface of the accessory bag or other item to which it is attached. In addition, all of the zipper pulls described herein do not necessarily need to be grasped. That is, a user can simply pass one or more fingers or a portion of their hand through a loop of the zipper pull, and then provide a force against a portion of the loop using any surface of their finger or hand. The preferred relatively soft surfaced, pliable, and large diameter materials forming the zipper pull loops are comfortable against the user's skin surfaces and prevent bruising or cuts.

Embodiments of the present invention and variations thereof also have application for use in other stationary or moveable items, such as, but not limited to, water craft and floatation devices, hang gliders, hospital beds, horse saddles, bicycles, golf carts, and lawn tractors. Accordingly, adaptations of embodiments of the present invention for such alternate applications are within the scope of the present invention.

While an effort has been made to describe various alternatives to the preferred embodiment, other alternatives will readily come to mind to those skilled in the art. Therefore, it should be understood that the invention may be embodied in other specific forms without departing from the spirit or central characteristics thereof. Present examples and embodiments, therefore, are to be considered in all respects as illustrative and not restrictive, and the invention is not intended to be limited to the details given herein.

To assist in the understanding of the present invention the following list of components and associated numbering found in the drawings is provided herein:

| # | Component |
|---|---|
| 2 | Storage bag |
| 4 | Mother bag or docking station |
| 6 | Accessory bag |
| 8 | Tether |
| 10 | Attachment hardware |
| 12 | Handles |
| 14 | Zippers |
| 16, 16a-16e | Zipper pulls |
| 18 | Receiving pocket |
| 20 | Mesh |
| 22 | Hook and loop fastener |
| 24 | Strap |
| 26 | Magnet fasteners |
| 28 | Lap belt |
| 30 | Weep holes |
| 32 | Attachment loops |
| 34 | Underseat bin |
| 36 | Wheelchair or personal mobility device |
| 38 | Wheelchair/mobility device back rest |

-continued

| # | Component |
|---|---|
| 40 | Wheelchair/mobility device armrest |
| 42 | Wheelchair/mobility device seat |
| 44 | Armrest pouch |
| 46 | Armrest pouch suspension strap |
| 48 | Lap belt contoured shape |
| 50 | Cable ties |
| 52 | Variable position storage device |
| 54 | Interconnection straps |
| 56 | Attachment disks |
| 58 | Storage pockets |
| 60 | Connecting portions |
| 62 | First end |
| 64 | Second end |
| 66 | Single loop |
| 68 | Opening |
| 70 | Reinforcing base member |
| 72 | Triangular shaped opening |
| 74 | Thickened base |
| 76 | Zipper connection mechanism |
| 78 | Outer loop |
| 80 | Inner member |
| 82a, 82b | Openings |
| 84 | Three-part loop |
| 86a | First portion |
| 86b | Second portion |
| 86c | Third portion |
| 88 | Four-part loop |
| 90a | First portion |
| 90b | Second portion |
| 90c | Third portion |
| 90d | Fourth portion |
| 92 | Sleeve of material |

What is claimed is:

1. A storage system adapted for interconnection to a personal mobility device, comprising:

a docking station having at least one receptacle with an open top and a first volume defined by two lateral panels interconnected to a bottom panel, each lateral panel being oriented at an angle greater than 90 degrees relative to said bottom panel, said first volume having an internal surface area and wherein said open top has a larger perimeter shape than a perimeter shape of said bottom panel;

a means for interconnecting said docking station to the personal mobility device;

an accessory bag having a second volume defined by an exterior surface area that is substantially similar to said internal surface area of said docking station and which is adapted to matingly engage with said first volume of said docking station, said accessory bag having a lower portion with a perimeter shape which is less than said perimeter shape of said open top;

at least one opening in said accessory bag to provide access thereto; and an elastic tether operatively interconnected on a first end to said docking station, and on a second end to said accessory bag, said elastic tether having a length sufficient to allow said accessory bag to be held and accessed by a user of the personal mobility device.

2. The storage system of claim 1, wherein the personal mobility device is a wheelchair.

3. The storage system of claim 1, wherein said docking station is a mother bag capable of storing personal effects.

4. The storage system of claim 1, wherein said means for interconnecting comprises at least one strap with at least one of a buckle, a hook and loop material and a cinch strap.

5. The storage system of claim 1, further comprising a closure means operably engaged to said at least one opening.

6. The storage system of claim 5, said closure means comprises at least one of a zipper and a hook and loop material.

7. The storage system of claim 1, wherein said elastic tether is comprised substantially of rubber.

8. The storage system of claim 1, wherein said elastic tether is retractable into a housing that comprises a biased winding means.

9. The storage system of claim 1, wherein said docking station has at least one weep hole to allow drainage of a liquid.

10. The storage system of claim 1, wherein said elastic tether is interconnected to said accessory bag with an attachment hardware.

11. A storage system adapted for interconnection to a personal mobility device, comprising:

a means for containing defined by an open top receptacle comprising an interior front surface, an interior back surface, and interior side surfaces interconnected to an interior bottom surface, wherein said interior front surface, said interior back surface and said interior side surfaces are angled such that said interior bottom surface possesses a first area that is less than a second area defined by an upper edge of said open top receptacle;

a means for interconnecting said means for containing to the personal mobility device;

a means for holding wherein at least a portion of said means for holding is sized to fit within said receptacle, said means for holding comprising an exterior front surface, an exterior back surface, an exterior bottom surface, and two exterior side surfaces, wherein said exterior bottom surface is generally equal to said first area of said means for containing and wherein said means for holding has an exterior shape that is substantially similar to said interior shape of said means for containing;

an elastic means for tethering interconnected to said means for holding and to said means for containing; and wherein said elastic means for tethering maintains interconnection of said means for holding to the personal mobility device if said means for holding is released by a user.

12. The storage system as claimed in claim 11, further comprising a means for opening said means for holding, said means for opening comprising a loop mechanism for receiving at least one finger of the user's hand.

13. The storage system as claimed in claim 11, further comprising a means for draining said means for containing.

14. The storage system as claimed in claim 13, wherein said means for draining comprises at least one weep hole.

15. The storage system as claimed in claim 11, further comprising a means for enclosing at least a portion of said elastic means for tethering.

16. The storage system as claimed in claim 15, wherein said means for enclosing comprises a sheath.

17. The storage system as claimed in claim 11, wherein said means for containing comprises a mother bag.

18. The storage system as claimed in claim 11, wherein said means for interconnecting comprises a strap.

19. The storage system as claimed in claim 11, wherein said means for holding comprises an accessory bag.

20. The storage system as claimed in claim 11, wherein said elastic means for tethering comprises an elongated member.

21. The storage system as claimed in claim 20, wherein the elongated member comprises at least one of a bungee cord and a rubber material.

22. A personal mobility device with a storage system, comprising:

a personal mobility device;

a first receptacle interconnected to said personal mobility device having an opening defined by an interior perimeter shape and including two lateral panels interconnected to a bottom panel wherein said interior perimeter shape of said opening is greater then an interior perimeter shape of said bottom panel;

a second receptacle having a lower end with an exterior perimeter shape which is less than said interior perimeter shape, said interior shape of said first receptacle and said exterior shape of said second receptacle being substantially identical, wherein said second receptacle nests within said first receptacle; and an elastic tether interconnected on a first end to said first receptacle, and on a second end to said second receptacle, said elastic tether having a length sufficient to allow said second receptacle to be held and accessed by a user of said personal mobility device.

23. The device of claim 22, wherein the personal mobility device is at least one of a wheelchair, and a scooter.

24. The device of claim 22, wherein said elastic tether is retractable into a housing that comprises a biased winding means.

25. The device of claim 22, wherein said first receptacle has at least one weep hole to allow drainage of a liquid.

26. The device of claim 22, wherein said first receptacle is interconnected to at least one of a chair portion, an armrest and a seat of said personal mobility device.

* * * * *